Patented Mar. 10, 1942

2,275,513

UNITED STATES PATENT OFFICE 2,275,513

TREATMENT OF TEXTILES AND OTHER SHAPED ARTICLES MADE OF CELLULOSE DERIVATIVES

Henry Dreyfus, London, England, assignor to Celanese Corporation of America, a corporation of Delaware No Drawing. Application January 25, 1941, Serial No. 375,958. In Great Britain January 19, 1940

3 Claims. (Cl. 8—129)

This invention is concerned with improvements in or relating to the treatment of textiles and other shaped articles, e. g. films, and especially articles having a basis of cellulose acetate or other organic derivative of cellulose.

It has been discovered that the waterproof properties of yarns, films and other shaped articles having a basis of an organic derivative of cellulose may be increased very considerably by heating them in a non-solvent medium containing or prepared from a lower aliphatic monocarboxylic acid or anhydride and a higher aliphatic monocarboxylic anhydride or acid respectively. The lower monocarboxylic acid radicle is preferably the acetyl radicle, but may, for example, be the radicle of propionic or butyric acid, and the higher aliphatic monocarboxylic acid radicle may, for example, be the radicle of caproic acid or caprylic acid but is preferably that of lauric acid or a higher homologue thereof, for example palmitic or stearic acid. The reaction probably involves the formation of the mixed anhydride of the two types of acids. An esterification medium containing an organic non-solvent liquid and a low concentration of such a mixed anhydride which has previously been prepared and isolated may also be used.

It has been found that esterification by the process of the present invention gives much better results than when there is no non-solvent liquid present or when a higher aliphatic acid halide is employed, since in general this reduces the breaking strength of the articles very considerably.

The process is particularly valuable for the treatment of materials made of acetone-soluble cellulose acetate or other lower fatty acid ester of cellulose, e. g. cellulose propionate or butyrate. The materials treated may be yarns in hank or other package form, e. g. hanks of ordinary, stretched or stretched and shrunk cellulose acetate yarns, woven, knitted or other fabrics, foils, films or similar articles.

The treatment may be effected by introducing the materials into a medium containing a mixture of a lower aliphatic monocarboxylic acid and of the anhydride of a higher aliphatic monocarboxylic acid or, alternatively, of the higher acid and the anhydride of the lower acid and then heating the medium, in which case the mixed anhydride may be formed in the presence of the materials, but preferably they are introduced into a medium containing the mixed anhydride. This may be formed by heating a solution of an acid and an anhydride in an organic liquid which is a non-solvent for the materials for a time, e. g. 30 minutes to 1 hour, so as to form the mixed anhydride and drive off any lower monocarboxylic acid formed or present in excess. In general, better results are obtained if the esterification medium is free or substantially free from lower monocarboxylic acid and is maintained free during the reaction by allowing any such acid formed to distil over.

The reaction is carried out at a temperature of at least 100° C. and particularly at a temperature of about 140° C. Temperatures above 150° or 160° are not in general necessary. The esterification medium should contain only a low concentration of the esterifying agents, for example a total concentration of about 5–10% of organic acid radicles dissolved in an organic liquid which is a non-solvent for the materials. It is important that a high volume ratio of esterifying medium to materials should be maintained throughout the reaction, e. g. a volume-ratio of 50:1 or 100:1. Preferably the non-solvent liquid has a boiling point approximately the same as the reaction temperature to be employed, so that the reaction can be carried out at the boiling point, which simplifies temperature control. Xylene has been found to be very suitable for this purpose while other liquids which may be employed are toluene and kerosene. The treatment of the materials is preferably continued until an increase in weight of from about 5–10% or somewhat more has been obtained and in general this requires about 2–6 hours, for example 4 hours.

The following example is given to illustrate the invention:

*Example*

Fabric made of acetone-soluble cellulose acetate yarn is boiled for 2–4 hours in an esterification medium prepared by boiling a mixture of 5% of stearic acid, 1% of acetic anhydride and 94% of xylene for about 1 hour. The heating both during the preparation of the esterification medium and during the treatment of the materials is carried out under such conditions that acetic acid formed is distilled over and condensed. The volume ratio of medium to materials is about 50:1. The heated fabric is thoroughly washed with carbon tetrachloride and dried.

By the process of the present invention it is possible so to improve the water-proof properties of materials that whereas when water is dropped on an untreated cellulose acetate fabric under certain conditions it passes through it immediately, when the treated fabric is subjected to a similar test the water does not pass through for over two minutes. Again, the water-proof properties of a hose made of cellulose acetate yarn may be improved so that when a quantity of water is put inside the water does not pass through the hose until pressure is applied and even then it does not wet the yarns.

Having described my invention, what I desire to secure by Letters Patent is:

1. Process for the treatment of textile materials, foils, films and the like having a basis of an organic derivative of cellulose, which comprises heating said materials at a temperature of at least 100° C. until the water-proof properties of said materials are improved, in an esterification medium which has substantially no solvent action on the base of said materials and which contains an organic liquid which has substantially no solvent action on the base of said materials, a compound having a lower aliphatic mono-carboxylic acid radicle containing at most 4 carbon atoms and a compound having a higher aliphatic mono-carboxylic acid radicle containing at least 6 carbon atoms, the total concentration of said acid radicles being from 5 to 10% and at least one of the latter two compounds being present as an anhydride, the volume-ratio of esterification medium to materials being at least 50:1.

2. Process for the treatment of textile materials, foils, films and the like having a basis of an acetone-soluble cellulose acetate, which comprises heating said materials at a temperature of at least 100° C. until the water-proof properties of said materials are improved, in an esterification medium which has substantially no solvent action on the base of said materials and which contains an organic liquid which has substantially no solvent action on the base of said materials, a compound having a lower aliphatic mono-carboxylic acid radicle containing at most 4 carbon atoms and a compound having a higher aliphatic mono-carboxylic acid radicle containing at least 6 carbon atoms, the total concentration of said acid radicles being from 5 to 10% and at least one of the latter two compounds being present as an anhydride, the volume-ratio of esterification medium to materials being at least 50:1.

3. Process for the treatment of textile materials, foils, films and the like having a basis of an acetone-soluble cellulose acetate, which comprises heating said materials at a temperature of at least 100° C. until the water-proof properties of said materials are improved, in an esterification medium which has substantially no solvent action on the base of said materials and which contains xylene, acetic anhydride and stearic acid, the total concentration of the acetic and stearic acid radicles being from 5 to 10% and the volume-ratio of esterification medium to materials being about 50:1.

HENRY DREYFUS.